Figure 1:
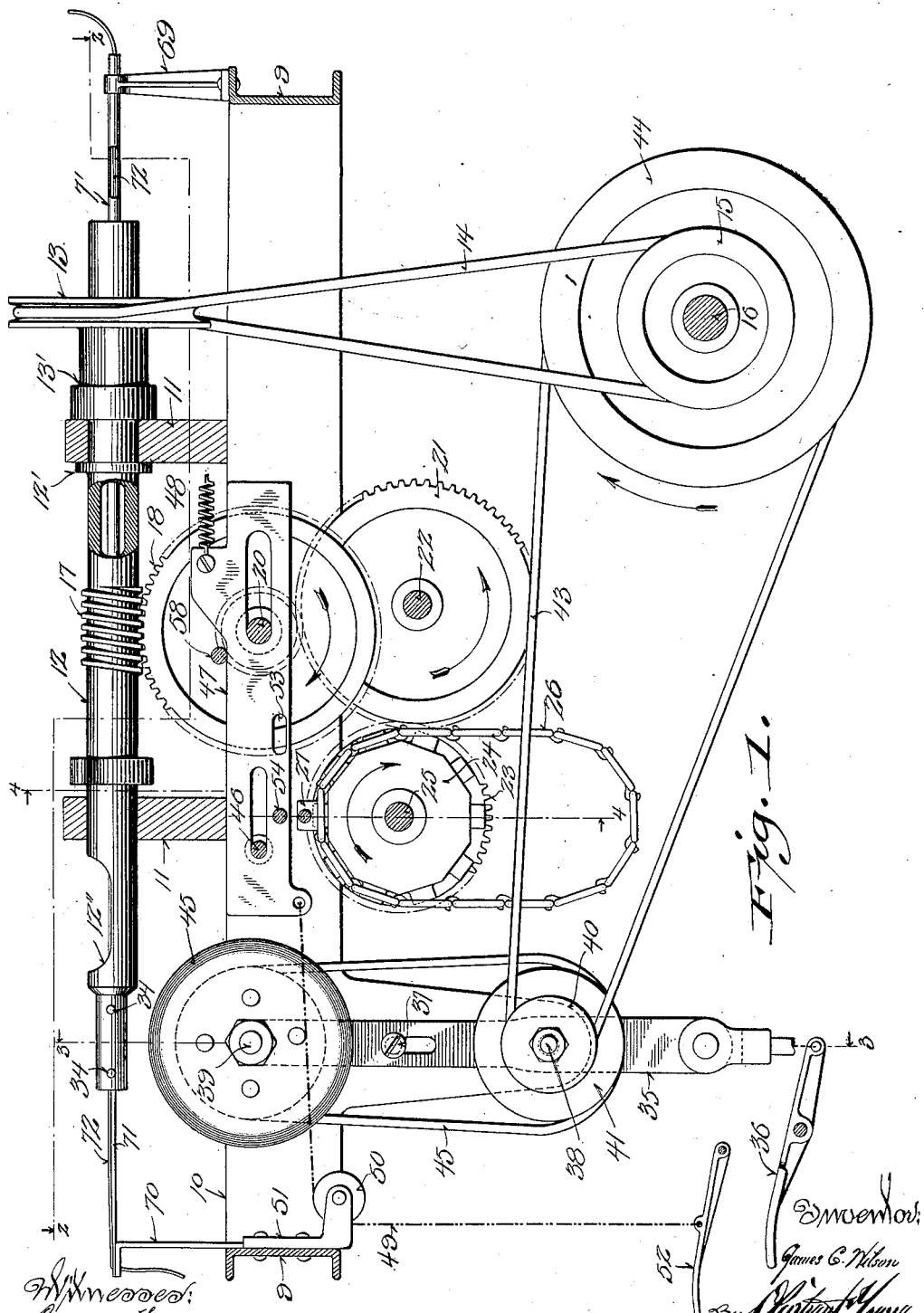

J. C. WILSON.
POMPON MAKING MACHINE.
APPLICATION FILED FEB. 17, 1913.

1,094,042.

Patented Apr. 21, 1914.
3 SHEETS—SHEET 1.

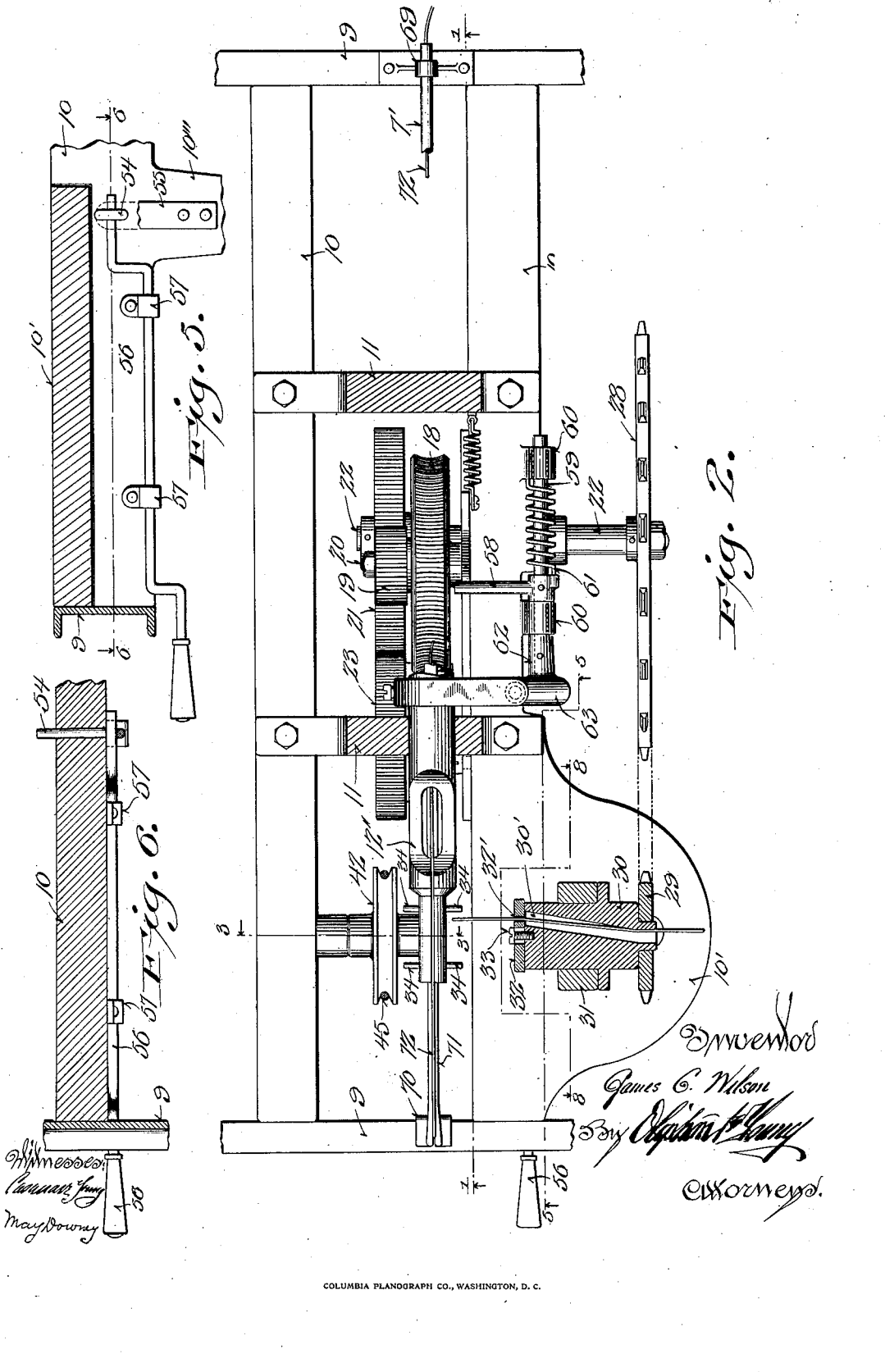

J. C. WILSON.
POMPON MAKING MACHINE.
APPLICATION FILED FEB. 17, 1913.
1,094,042.
Patented Apr. 21, 1914.
3 SHEETS—SHEET 3.
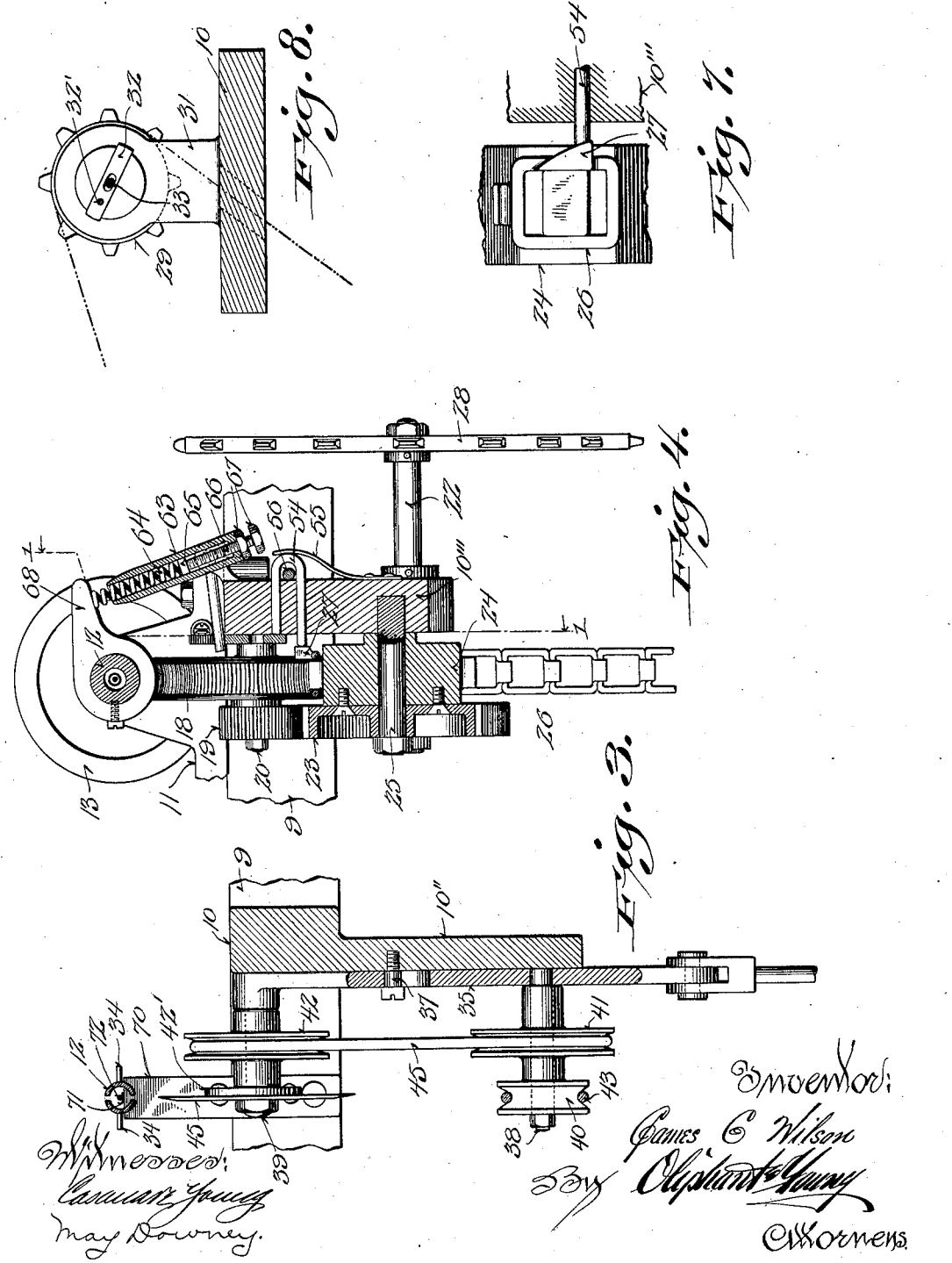

UNITED STATES PATENT OFFICE.

JAMES C. WILSON, OF MILWAUKEE, WISCONSIN.

POMPON-MAKING MACHINE.

1,094,042.

Specification of Letters Patent. Patented Apr. 21, 1914.

Application filed February 17, 1913. Serial No. 748,915.

*To all whom it may concern:*

Be it known that I, JAMES C. WILSON, a citizen of the United States, and resident of Milwaukee, in the county of Milwaukee and State of Wisconsin, have invented certain new and useful Improvements in Pompon-Making Machines; and I do hereby declare that the following is a full, clear, and exact description thereof.

My invention consists in what is herein particularly set forth with reference to the accompanying drawings and pointed out in the claims of this specification, its object being to provide simple, economical and efficient machines by which to facilitate the production of pompons, as well as to save the waste of material that results from the making of the goods by hand.

Figure 1 of the drawings represents a partly sectional elevation of a machine in accordance with my invention having parts thereof broken away, the view being from a side of the machine and the section generally indicated by line 1—1 in Figs. 2 and 4; Fig. 2, a plan view of the machine partly in horizontal section as generally indicated by line 2—2 in Fig. 1; Fig. 3, a transverse sectional view of a fragment of the machine generally indicated by line 3—3 in Figs. 1 and 2; Fig. 4, a similar view generally indicated by line 4—4 in Fig. 1; Fig. 5, an elevation of a fragment of the machine partly in section, the view being generally indicated by line 5—5 in Fig. 2; Fig. 6, a similar view indicated by line 6—6 in Fig. 5; Fig. 7, a plan view partly in section illustrating a detail of the machine, and Fig. 8, an elevation of a fragment of the machine partly in section, this view being generally indicated by line 8—8 in Fig. 2.

Referring by numerals to the drawings, 9 indicate each of a pair of end bars, and 10 each of a pair of side bars of the frame of the herein described machine, said frame being mounted on legs (not shown) or otherwise suitably supported. Fast on the frame are bearing-blocks 11 for a hollow spindle 12 having a collar 12' opposing one of said blocks. Fast on the spindle in opposition to an adjacent bearing-block is the hub 13' of a pulley 13 driven by a belt 14 from another pulley 15 fast on the main shaft 16 of the machine.

A worm 17 on the spindle meshes with a worm-wheel 18 combined with a spur-gear pinion 19, the two being loose on an arbor 20 with which a side bar of the machine frame is provided. The pinion 19 meshes with a spur-gear wheel 21 fast on a shaft 22 for which the adjacent frame-bar is provided with a bearing, and said spur-wheel meshes with a similar wheel 23 combined with a sprocket-wheel 24, the two being loose on an arbor 25 that extends from said frame-bar. Engaging the sprocket-wheel 24 is a link-belt 26 having one link thereof provided with a cam-lug 27 for the purpose hereinafter specified.

Fast on the shaft 22 is a driving sprocket-wheel 28 in link-belt connection with a driven sprocket wheel 29 fast on a bored cylindrical block 30 for which a bearing-standard 31 is provided on a lateral extension 10' of one of the side bars of the machine frame. As shown in Fig. 2, the cylindrical block 30 has a partly oblique bore 30', and adjustably secured in connection with inner end of said block is a plate 32 having an eye 32' that registers with said bore. The plate is held in adjusted position by means of a set-screw 33 that extends through a longitudinal slot of the same into the adjacent block. The bored rotary cylindrical block and the eye-plate therewith constitute a yarn-guide at a right-angle to the spindle 12, and the plate-eye is eccentric to the axis of said block, the degree of eccentricity being determined by the adjustment of said plate for the purpose hereinafter specified.

The end of the spindle adjacent to the yarn-guide is longitudinally split, and the split intersects a finger-notch 12" provided in said spindle. Forward of its finger-notch, the spindle is preferably reduced and provided with laterally projecting pins 34 between which to wind yarn from said guide.

Opposing a frame-bar and a depending web 10" of the same is a vertical slide 35 linked to a treadle-lever 36, the slide being provided with a longitudinal slot engaged by a guide-bolt 37, and carried in connection with the slide are arbors 38, 39, for pulleys 40, 41, 42. The pulley 40 is driven by a belt 43 from a pulley 44 fast on the main shaft 16, and said pulley 40 is combined with the pulley 41 from which motion is transmitted by a belt 45 to the pulley 42, and fastened to a hub-flange 42' of said pulley 42 is a cutting-disk 45 that registers with the split in the end of the aforesaid spindle when the latter is at rest.

Engaged by the arbor 20 and a guidescrew 46, projecting from the adjacent frame-bar, are longitudinal slots of a cam-plate 47, and a spiral-spring 48 is connected at its ends to the cam-plate and one of the bearing-blocks 11. A flexible runner 49, connected to the cam-plate, is trained on a sheave 50 suspended in a bracket 51 attached to an end bar of the machine-frame and attached to a treadle-lever 52, the pull of the runner being against resistance of said spring. The cam-plate is provided with an aperture 53 for the engagement of one end of a bow-stop 54 guided in a depending web 10''' of the adjacent frame-bar, the bow-end of the stop being opposed by a leaf-spring 55 attached to said frame-bar web. The other end of the bow-stop is in the path of the cam-lug 27 of the link-belt 26 by which said stop is disengaged from the cam-plate against resistance of the spring 55 to permit automatic retraction of the cam-plate. A crank-rod 56 supported in bearings 57 attached to the adjacent frame-bar engages the bow-end of the stop 54 to provide for manual disengagement of said stop from the aforesaid cam-plate whenever necessary or desirable to permit retraction of said plate before the cam-lug of the link-belt is effective for that purpose.

The rise of the cam-plate is opposed to a crank-arm 58 of a rod 59 that turns in bearings 60 with which the adjacent frame-bar is provided, and a spiral-spring 61 on the rod is connected at its ends to the crank-arm and one of said bearings. Fast on the spring-controlled rod is the right-angle shank 62 of a socket-stop 63 containing a spiral-spring 64 seated on a follower 65 opposed by an adjusting-screw 66 engaging said stop and having set-nuts 67 thereon. The spring 64 is normally in the path of an arm 68 fast on the spindle 12 to cushion the impact of the same against the stop 63, the resistance of said spring to said arm being regulated by the adjustment of the follower 65, and by manipulation of the treadle 52 the cam-plate is actuated to move said stop and cushion-spring therewith out of the path of the spindle arm against resistance of the spring 61, by which the aforesaid stop is returned to normal position when said treadle is released. The spindle 12 being stopped there is slip of the belt 14 on the spindle-pulley 13.

Supported in connection with end brackets 69, 70, of the machine-frame is a partly tubular cord-guide 71 that extends through the spindle 12, its forward portion being slabbed and kerfed in register with a kerf in the bracket 70.

In practice, a cord 72 is run through the guide 71 and caught in the kerf of said guide and the supporting bracket 70 for the same. Yarn from its guide, embodying the eye-plate 32, is attached to the split-end of the spindle 12, the adjustment of said plate determining the length of the wind on said spindle. At this time the various parts of the machine are in normal position, the cam-plate 47 being unlatched as best shown in Fig. 4, and by manipulating the treadle-lever 52, said cam-plate is moved to effect a disengagement of the stop 63 from the arm 68, whereupon rotary motion is imparted to the spindle, and motion transmitted to the sprocket-wheel 24 and the yarn-guide by means of the gearing above specified, the aforesaid cam-plate being latched in its adjusted position by the stop 54. The yarn is wound on the spindle during the time the link-belt 26, suspended on the sprocket-wheel 24, makes one revolution to bring its cam-lug into engagement with the stop 54 and thus retract the same from the cam-plate 47, whereupon said plate is automatically returned to normal position permitting the stop 63 to come in the path of the arm 68 and thus prevent further rotation on the part of said spindle. The operator now withdraws the end of the cord 72 from the kerfed end of the cord-guide 71 with one hand, and with the other hand picks said cord away from said guide through the notch 12'' in the spindle. The wound yarn is tied with the cord drawn taut thereon through the split of the spindle from above, and the treadle-lever 36 is manipulated to elevate the rotary cutting-disk 45 through said split from below to sever the wound yarn, the result being a finished pompon without waste of the material employed. The cord is again caught in the kerfed end of its guide and the operations aforesaid repeated. The production of the pompons is rapid and a skilled operative is not necessary for the machine.

By lengthening or shortening the link-belt 26, the revolutions of the spindle with reference to winding of the yarn may be varied according to the quantity of said yarn requisite for the pompons to be produced.

I claim:—

1. A pompon making machine comprising an intermittent rotary hollow spindle having a split end and a notch intersected by the split, means for guiding yarn on the split-end of the spindle, a cutter registrable with said split when the spindle is at rest, and means for reciprocating the cutter.

2. A pompon making machine comprising an intermittent rotary hollow spindle having a split end and a notch intersected by the split, means for guiding yarn onto the split-end of the spindle, and regulating the length of the wind, a cutter registrable with said split when the spindle is at rest, and means for reciprocating the cutter.

3. A pompon making machine comprising an intermittent rotary hollow spindle having a split end and a notch intersected by the split, a rotary yarn-guide laterally opposite the split-end of the spindle, a cutter registrable with said split when the spindle is at rest, and means for reciprocating the cutter.

4. A pompon making machine comprising an intermittent rotary hollow spindle having a split end and a notch intersected by the split, an obliquely bored rotary block, a plate adjustable on an end of the block and provided with an eye in register with the block-bore laterally opposite the split-end of the spindle, said block and plate constituting a yarn-guide; a cutter registrable with said split when the spindle is at rest, and means for reciprocating the cutter.

5. A pompon making machine comprising an intermittent rotary hollow spindle having a split end and a notch intersected by the split, a cord-guide extending through the spindle, the cord thereon being accessible through the spindle-notch; means for guiding yarn on the split-end of the spindle, a cutter registrable with said split when the spindle is at rest, and means for reciprocating the cutter.

6. A pompon making machine comprising an intermittent rotary hollow spindle having a split end and a notch intersected by the split, a cord-guide and holder extending through the spindle, the cord thereon being accessible through the spindle-notch; means for guiding yarn on the split-end of the spindle, a cutter registrable with said split when the spindle is at rest, and means for reciprocating the cutter.

7. A pompon making machine comprising an intermittent rotary hollow spindle having a split end and a notch intersected by the split, a cord guide extending through the spindle and having a kerfed end, the cord thereon being accessible through the spindle-notch; means for guiding yarn on the split-end of the spindle, a cutter registrable with said split when the spindle is at rest, and means for reciprocating the cutter.

8. A pompon making machine comprising a hollow driven spindle having a split end and a notch intersected by the split, manually actuated start and stop mechanism for the spindle, means for guiding yarn on the split-end of the spindle, a cutter registrable with said split when the spindle is at rest, and means for reciprocating the cutter.

9. A pompon making machine comprising a hollow driven spindle having a split end and a notch intersected by the split, means for automatically limiting rotation of the spindle, means by which to manually start the spindle, means for guiding yarn on the split-end of the spindle, a cutter registrable with said split when the spindle is at rest, and means for reciprocating the cutter.

10. A pompon making machine comprising a hollow driven spindle having a split end and a notch intersected by the split, start and stop mechanism for the spindle, means for guiding yarn on the split-end of the spindle, a cord-guide extending through said spindle, the cord being accessible through the spindle-notch; a cutter registrable with said split when the spindle is at rest, and means for reciprocating the cutter.

11. A pompon making machine comprising a hollow driven spindle having a split end and a notch intersected by the split, start and stop mechanism for the spindle, means for guiding yarn on the split-end of the spindle, a kerfed end cord-guide extending through said spindle, the cord being accessible through the spindle-notch; a cutter registrable with said split when the spindle it at rest, and means for reciprocating the cutter.

12. A pompon making machine comprising a hollow driven spindle having an outer worm, a projecting arm, a split end and a notch intersecting the split; a worm-wheel in mesh with the spindle-worm and constituting part of a gear-train, a rotary yarn-guide laterally opposite the split-end of the spindle, means for transmitting motion from the gear-train to the yarn-guide, a sprocket-wheel driven by said gear-train, a link-belt suspended on the sprocket-wheel and provided with a cam-lug, a spring-controlled reciprocative stop in the path of said lug, a treadle-and-spring controlled sliding cam-plate engageable by said stop, a spring-controlled rocker stop normally in the path of the spindle-arm and having a crank in opposition to a rise of the cam-plate, a treadle-controlled slide carrying a rotary cutter that registers with the spindle-slit when the spindle is at rest, and means for driving the cutter.

13. A pompon making machine comprising a hollow driven spindle having an outer worm, a projecting arm, a split end and a notch intersecting the split; a worm wheel in mesh with the spindle-worm and constituting part of a gear-train, a rotary yarn-guide laterally opposite the split-end of the spindle, means for transmitting motion from the gear-train to the yarn-guide, a sprocket-wheel driven by said gear-train, a link-belt suspended on the sprocket-wheel and provided with a cam-lug, a spring-controlled reciprocative stop in the path of said lug, a treadle-and-spring controlled sliding cam-plate engageable by said stop, a spring-controlled rocker-stop normally in the path of the spindle-arm and carrying a cushioning spring normally in the path of the spindle-arm and having a crank in opposition to a rise of the cam-plate, a treadle-controlled slide carrying a rotary cutter that registers with the spindle-slit when the spindle is at rest, and means for driving the cutter.

14. A pompon making machine comprising a hollow driven spindle having an outer worm, a projecting arm, a split end and a notch intersecting the split; a worm-wheel in mesh with the spindle-worm and constituting part of a gear-train, a rotary yarn-guide laterally opposite the split-end of the spindle, means for transmitting motion from the gear-train to the yarn-guide, a sprocket-wheel driven by said gear-train, a link-belt suspended on the sprocket-wheel and provided with a cam-lug, a spring-controlled reciprocative stop in the path of said lug, a treadle-and-spring controlled sliding cam-plate engageable by said stop, a spring-controlled rocker stop normally in the path of the spindle-arm and carrying a cushioning spring normally in the path of the spindle-arm and having a crank in opposition to a rise of the cam-plate, means for adjusting the spring outward from the rocker-stop, a treadle-controlled slide carrying a rotary cutter that registers with the spindle-slit when the spindle is at rest, and means for driving the cutter.

15. A pompon making machine comprising a hollow driven spindle having an outer worm, a projecting arm, a split end and a notch intersecting the split; a worm wheel in mesh with the spindle-worm and constituting part of a gear-train, a rotary yarn-guide laterally opposite the split-end of the spindle, means for transmitting motion from the gear-train to the yarn-guide, a sprocket-wheel driven by said gear-train, a link-belt suspended on the sprocket-wheel and provided with a cam-lug, a spring-controlled reciprocative stop in the path of said lug, a treadle-and-spring controlled sliding cam-plate engageable by said stop, a spring-controlled rocker stop normally in the path of the spindle-arm and having a crank in opposition to a rise of the cam-plate, a treadle-controlled slide carrying a rotary cutter that registers with the spindle-slit when the spindle is at rest, means for driving the cutter, and a cord-guide extending through the spindle, the cord thereon being accessible through the spindle-notch.

16. A pompon making machine comprising a hollow driven spindle having an outer worm, a projecting arm, a split end and a notch intersecting the split; a worm wheel in mesh with the spindle-worm and constituting part of a gear-train, a rotary yarn-guide laterally opposite the split-end of the spindle, means for transmitting motion from the gear-train to the yarn-guide, a sprocket-wheel driven by said gear-train, a link-belt suspended on the sprocket-wheel and provided with a cam-lug, a spring-controlled reciprocative stop in the path of said lug, means for manually retracting the stop, a treadle-and-spring controlled sliding cam-plate engageable by said sto, a spring-controlled rocker stop normally in the path of the spindle-arm and having a crank in opposition to a rise of the cam-plate, a treadle-controlled slide carrying a rotary cutter that registers with the spindle-slit when the spindle is at rest, and means for driving the cutter.

In testimony that I claim the foregoing I have hereunto set my hand at Milwaukee, in the county of Milwaukee and State of Wisconsin, in the presence of two witnesses.

JAMES C. WILSON.

Witnesses:
N. E. OLIPHANT,
M. E. DOWNEY.

---

Copies of this patent may be obtained for five cents each, by addressing the "Commissioner of Patents, Washington, D. C."